US009907097B2

(12) United States Patent
Naito et al.

(10) Patent No.: US 9,907,097 B2
(45) Date of Patent: *Feb. 27, 2018

(54) WIRELESS COMMUNICATION DEVICE, WIRELESS COMMUNICATION SYSTEM, PROGRAM AND WIRELESS COMMUNICATION METHOD

(71) Applicant: SONY CORPORATION, Tokyo (JP)

(72) Inventors: Masahiko Naito, Tokyo (JP); Katsutoshi Itoh, Tokyo (JP); Hideyuki Suzuki, Tokyo (JP)

(73) Assignee: SONY CORPORATION, Tokyo (JP)

( * ) Notice: Subject to any disclaimer, the term of this patent is extended or adjusted under 35 U.S.C. 154(b) by 444 days.

This patent is subject to a terminal disclaimer.

(21) Appl. No.: 13/933,434

(22) Filed: Jul. 2, 2013

(65) Prior Publication Data

US 2013/0294287 A1 Nov. 7, 2013

Related U.S. Application Data

(63) Continuation of application No. 12/938,650, filed on Nov. 3, 2010, now Pat. No. 8,503,331.

(30) Foreign Application Priority Data

Nov. 13, 2009 (JP) ................................. 2009-260293

(51) Int. Cl.
*H04L 12/24* (2006.01)
*H04L 12/751* (2013.01)
(Continued)

(52) U.S. Cl.
CPC ........... *H04W 76/02* (2013.01); *H04W 8/005* (2013.01); *H04W 12/04* (2013.01); *H04W 84/12* (2013.01); *H04W 84/20* (2013.01); *H04W 88/04* (2013.01)

(58) Field of Classification Search
CPC ........ H04L 41/12; H04L 45/02; H04W 80/04; H04W 88/06
(Continued)

(56) References Cited

U.S. PATENT DOCUMENTS 5,448,593 A * 9/1995 Hill ....................... G05D 1/0265
370/389
2001/0006552 A1* 7/2001 Salokannel ................... 380/272
(Continued)

FOREIGN PATENT DOCUMENTS

EP 1890443 A2 2/2008
JP 10-135965 5/1998
(Continued)

OTHER PUBLICATIONS

The sensible guide to 802.11y, Oct. 2008.*
(Continued)

*Primary Examiner* — Ronald B Abelson
(74) *Attorney, Agent, or Firm* — Paratus Law Group, PLLC

(57) ABSTRACT

A first station for communicating with a second station is disclosed. The first station may include a storage unit configured to store relationship information defining a communication relationship between the first station and the second station. The first station may also include a communication unit configured to communicate with the second station and with an access point. The communication relationship may be maintained when the communication unit begins communicating with the access point.

12 Claims, 10 Drawing Sheets

(51) Int. Cl.
*H04W 80/04* (2009.01)
*H04W 88/06* (2009.01)
*H04W 76/02* (2009.01)
*H04W 8/00* (2009.01)
*H04W 12/04* (2009.01)
*H04W 84/20* (2009.01)
*H04W 88/04* (2009.01)
*H04W 84/12* (2009.01)

(58) Field of Classification Search
USPC .............................................. 370/254, 328
See application file for complete search history.

(56) References Cited

U.S. PATENT DOCUMENTS

| | | | |
|---|---|---|---|
| 2002/0082019 A1* | 6/2002 | Sunay et al. | 455/442 |
| 2003/0219129 A1* | 11/2003 | Whelan | H04L 9/0891 380/270 |
| 2004/0057499 A1* | 3/2004 | Haartsen | H04L 25/03866 375/136 |
| 2005/0286476 A1 | 12/2005 | Crosswy et al. | |
| 2006/0178151 A1* | 8/2006 | Lappetelainen | H04W 40/00 455/450 |
| 2006/0217093 A1* | 9/2006 | Wang | H04B 7/026 455/136 |
| 2006/0294211 A1 | 12/2006 | Amato | |
| 2007/0064783 A1* | 3/2007 | Kuroda | H04W 16/10 375/222 |
| 2007/0123263 A1 | 5/2007 | Smith et al. | |
| 2007/0218951 A1* | 9/2007 | Risheq | H04B 7/15535 455/562.1 |
| 2008/0045152 A1* | 2/2008 | Boes | 455/63.1 |
| 2008/0062878 A1* | 3/2008 | Habetha | H04W 92/02 370/235 |
| 2008/0080404 A1* | 4/2008 | Kodim | 370/277 |
| 2008/0176561 A1* | 7/2008 | Shao | H04W 8/005 455/434 |
| 2008/0182616 A1 | 7/2008 | Connors et al. | |
| 2008/0205509 A1* | 8/2008 | Le Naour et al. | 375/240.01 |
| 2008/0240072 A1 | 10/2008 | Bykovnikov | |
| 2008/0299974 A1* | 12/2008 | Lee et al. | 455/436 |
| 2009/0237289 A1* | 9/2009 | Stoddard | H04K 3/28 342/14 |
| 2010/0136907 A1* | 6/2010 | Zhou et al. | 455/41.2 |
| 2010/0151865 A1* | 6/2010 | Camp et al. | 455/445 |

FOREIGN PATENT DOCUMENTS

| | | |
|---|---|---|
| JP | 2005-537692 | 12/2005 |
| JP | 2007-019968 | 1/2007 |
| JP | 2008-219868 | 9/2008 |
| JP | 2008-283590 | 11/2008 |
| JP | 2009-515431 | 4/2009 |
| WO | WO2004/062305 A1 | 7/2004 |
| WO | WO2008147269 * | 12/2008 ............ H04B 7/155 |
| WO | WO2009/090295 A1 | 7/2009 |

OTHER PUBLICATIONS

Jul. 16, 2014, Extended European Search Report for related EP application No. 10190270.8.

Jan. 7, 2014, JP communication issued for related JP application No. 2010-224304.

"IEEE Standard for Information Technology—Telecommunications and Information Exchange Between Systems—Local and Metropolitan Area Networks—Specific Requirements; Part 11: Wireless LAN Medium Access Control (MAC) and Physical Layer (PHY) Specifications", IEEE Computer Society, IEEE Std 802.11™—2007, (Revision of IEEE Std 802-11-1999), Cover-plus pp. 1-1184, (2007).

* cited by examiner

FIG. 5

| Category | Action Value | Channel Switch Mode | New Regulatory Class | New Channel Number | Channel Switch Count |
|---|---|---|---|---|---|
| Octets: 1 | 1 | 1 | 1 | 1 | 1 |

FIG. 9

| Element ID | Length | Channel Switch Mode | New Channel Number | Channel Switch Count |
|---|---|---|---|---|
| 1 | 1 | 1 | 1 | 1 |

Octets:

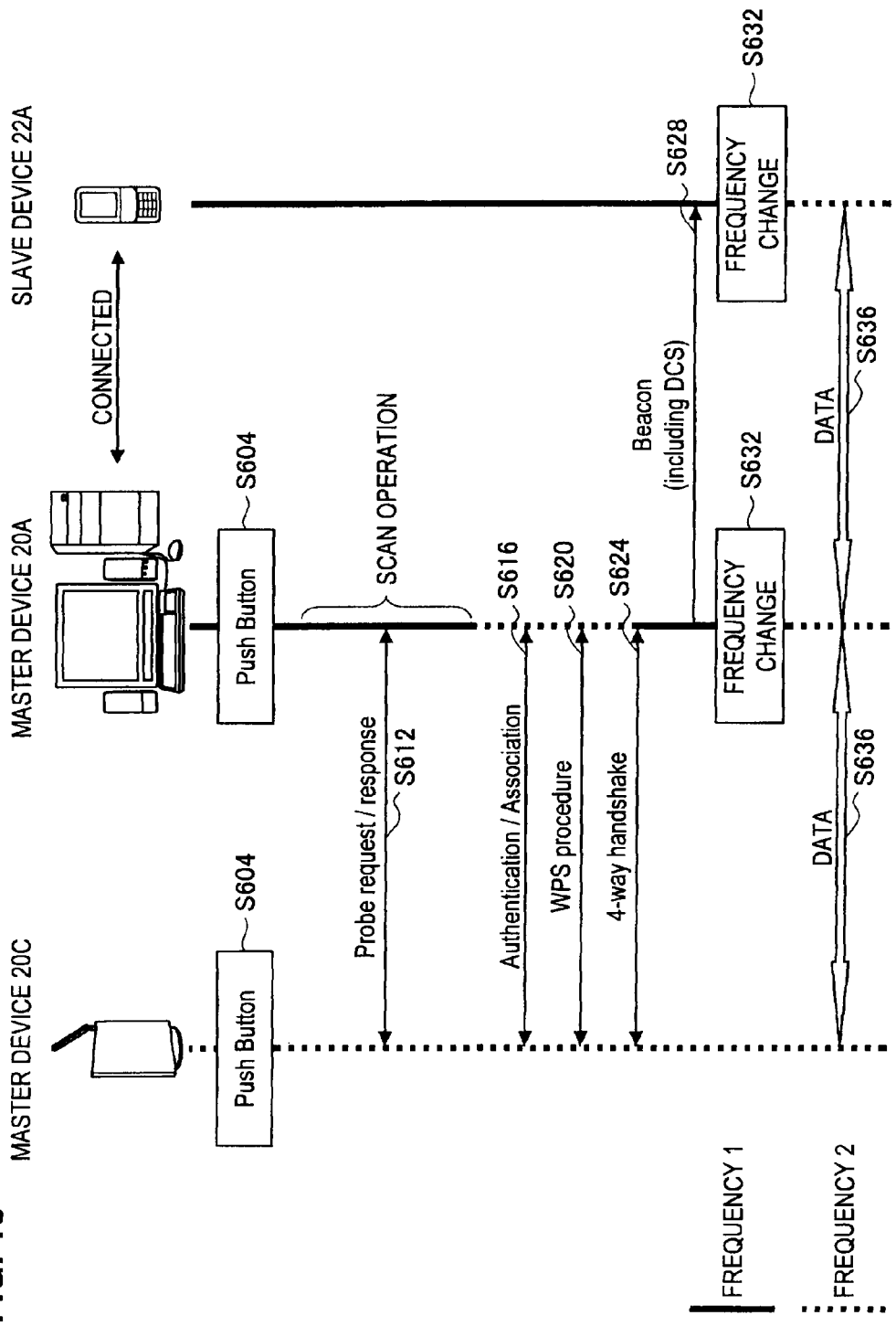

WIRELESS COMMUNICATION DEVICE, WIRELESS COMMUNICATION SYSTEM, PROGRAM AND WIRELESS COMMUNICATION METHOD

CROSS-REFERENCE TO RELATED APPLICATION

This application claims priority of Japanese Patent Application No. 2009-260293, filed on Nov. 13, 2009, the entire content of which is hereby incorporated by reference.

BACKGROUND

Technical Field

The present disclosure relates to a wireless communication device, a wireless communication system, a program and a wireless communication method.

Description of the Related Art

Recently, a wireless LAN (Local Area Network) system typified by IEEE (Institute of Electrical and Electronics Engineers) 802.11 has become widespread in place of wired networks, because the degree of freedom of a device can be enlarged. For example, as described in JP 2008-283590 A, a wireless LAN system defined in IEEE802.11 is configured from a group of wireless communication devices including an access point that operates as a master device and a plurality of stations that operates as slaves, and a plurality of stations are connected to an access point.

Moreover, a frequency to use in the wireless LAN system is, in general, configured autonomously by a master device or a user. In the wireless LAN system defined in IEEE802.11, a slave device detects the frequency that the master uses, and connects to the master device at the detected frequency to configure a group of the wireless communication devices. Note that the slave device may detect the frequency that the master uses by a beacon transmitted from the master device as notification information, or may detect the frequency that the master uses by transmitting and receiving a probe request and a probe response.

SUMMARY

Here, if there are two groups of wireless communication devices which use different frequencies respectively, the groups cannot communicate with each other since the frequencies each group uses are different. For this reason, in order to communicate between wireless communication devices belonging to different groups, connections between a plurality of wireless communication devices in one of the groups should be disconnected and connect the plurality of wireless communication devices to wireless communication devices in another group.

However, if the connection between the plurality of wireless communication devices in one group are disconnected, communications between the wireless communication devices are lost. Moreover, there has been a problem that it takes time to set an encryption (for example, WPS or WPA) for security again as connection processing, and that it is difficult for users.

In light of the foregoing, it is desirable to provide a wireless communication device, a wireless communication system, a program and a wireless communication method, which are novel and improved, and which are capable of connecting to another group while maintaining connections between wireless communication devices which configure a same group.

Accordingly, there is disclosed a first station for communicating with a second station. The first station may include a storage unit configured to store relationship information defining a communication relationship between the first station and the second station. The first station may also include a communication unit configured to communicate with the second station and with an access point. The communication relationship may be maintained when the communication unit begins communicating with the access point.

There is also disclosed a method of operating a first station. A processor may execute a program to cause the first station to perform the method. The program may be stored on a computer-readable storage medium. The method may include storing relationship information defining a communication relationship between the first station and a second station. The method may also include communicating with the second station and communicating with an access point. The communication relationship may be maintained when the first station begins communicating with the access point.

Consistent with the embodiments of the present invention described above, it becomes possible to connect to another group while maintaining connections between wireless communication devices which configure a same group.

BRIEF DESCRIPTION OF THE DRAWINGS

FIG. 5 is an explanatory diagram showing a configuration of an Extended Channel Switch Announcement message;

FIG. 9 is an explanatory diagram showing a configuration example of DFS information; and FIG. 10 is a sequence diagram showing an example of a fourth operation to connect different groups.

DETAILED DESCRIPTION

Figure 1:
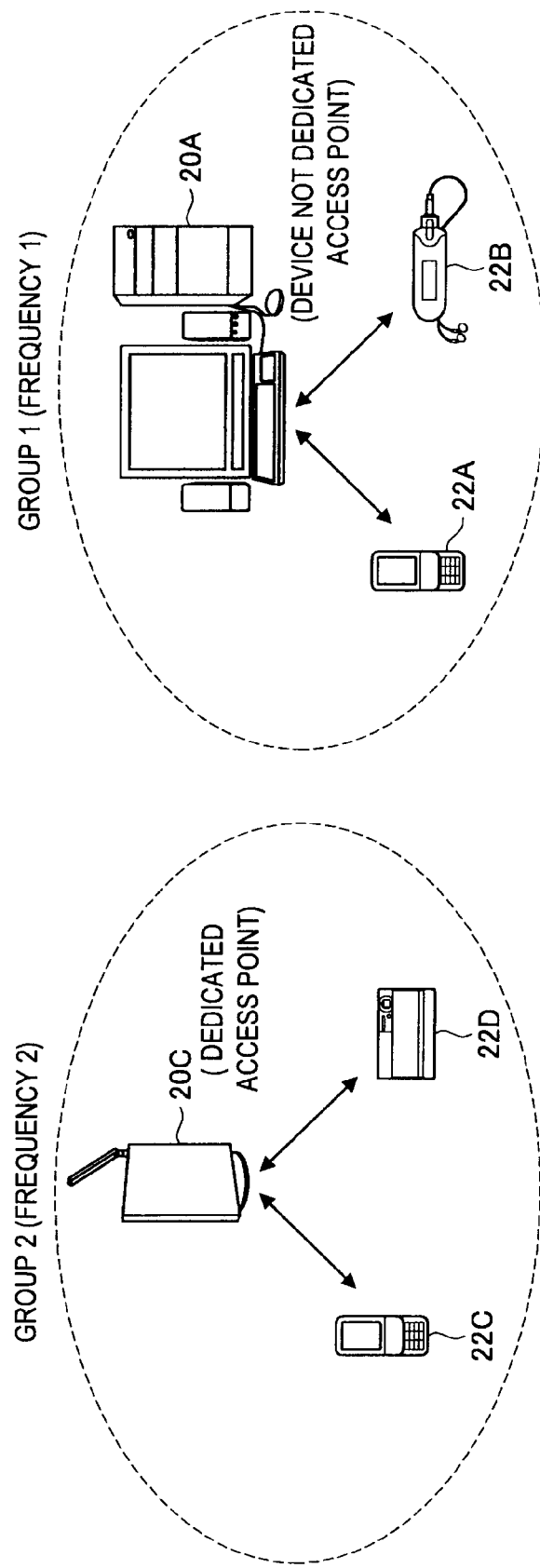
FIG. 1 is an explanatory diagram showing a configuration of a wireless communication system consistent with an embodiment of the present invention.

Hereinafter, embodiments of the present invention will be described in detail with reference to the appended drawings. Note that, in this specification and the appended drawings, structural elements that have substantially the same function and structure are denoted with the same reference numerals, and repeated explanation of these structural elements is omitted.

In this specification and the drawings, each of a plurality of structural elements having substantially the same function is distinguished by affixing a different alphabetical letter to the same reference numeral in some cases. For example, a plurality of structural elements having substantially the same function are distinguished like slave devices 22A and 22B where necessary. However, when there is no particular need to distinguish between a plurality of structural elements having the same function, they are denoted by the same reference numeral. For example, when there is no particular need to distinguish between the slave devices 22A and 22B, they are referred to simply as the slave devices 22.

Embodiments of the invention will be explained in the following order described below.

1. An overall configuration of a wireless communication system
2. A configuration of a wireless communication device
3. Connection operations between groups
    3-1. An example of a first operation
    3-2. An example of a second operation
    3-3. An example of a third operation
    3-4. An example of a fourth operation
4. Conclusion

1. AN OVERALL CONFIGURATION OF A WIRELESS COMMUNICATION SYSTEM

At first, the overall configuration of a wireless communication system will be explained with reference to FIG. 1.

FIG. 1 is an explanatory diagram showing a configuration of a wireless communication system. As shown in FIG. 1, the wireless communication system is configured from a plurality of groups of wireless communication stations (i.e., devices).

Specifically, a group 1 includes a master device 20A, and slave devices 22A and 22B which are connecting to the master device 20A. In the group 1, the master device 20A controls communication, and a frequency 1 is used for the communication. Note that, using WiFi Direct, it is possible that even if the master 20A is not a dedicated access point, it can perform operations of an access point, such as a beacon transmission, and connect a plurality of the slave devices 22 as shown in FIG. 1. It should be understood that the term "access point," as used herein, has the same meaning as in IEEE802.11-2007. In general, a router equipped with a built-in access point, called a wireless LAN router, is a dedicated access point. In the example herein, the master device 20A is a PC (personal computer) and is not a dedicated access point.

Moreover, a group 2 includes a master device 20C, and slave devices 22C and 22D which are connecting to the master device 20C. In the group 2, the master device 20C controls communication, and a frequency 2, which is different from the frequency the group 1 uses, is used for the communication. Here, the master device 20C is a dedicated access point.

Note that it may be or may not be determined, at a time of production of each wireless communication device, which wireless communication device is to operate as the master device 20 and which wireless communication device is to operate as the slave device 22. In a case where it is not determined, it may be determined by negotiation which wireless communication device is to operate as the master device and which wireless communication device is to operate as the slave device among a plurality of wireless communication devices.

Data transmitted between the master device 20 and the slave device 22 which belong to the same group is music data such as music, a radio program or the like, video data such as a movie, a television program, a vide program, a photograph, a document, a picture, a table or the like, a game data, a software or the like.

In FIG. 1, a case where the master device 22C is an access point and the master device 20A is a PC (Personal Computer) is illustrated as examples of the master devices 20, and cellular phones (22A, 22C), a mobile music player (22B), and an imaging device (22D) are illustrated as examples of the slave devices 22, however, the wireless communication devices such as the master device 20 and the slave devices 22 are not limited to these examples. For example, the wireless communication device may be an information processing apparatus such as a home video processing device (a DVD recorder, a video cassette recorder, or the like), a personal digital assistant (PDA), a home game machine, a home appliance, a portable video processing device, a portable game machine, or the like.

Figure 2:
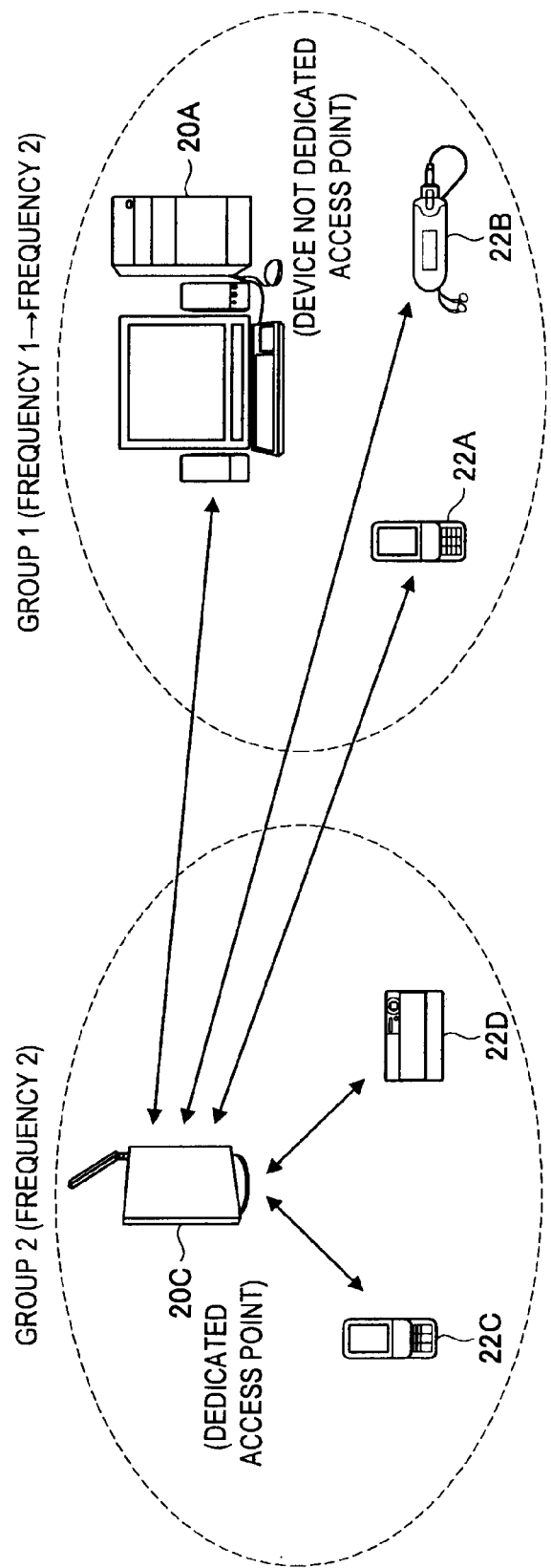
FIG. 2 is an explanatory diagram showing a problem in a connection between groups.

Here, in order to communicate between the wireless communication devices which belong to the different groups, there may be a method that disconnects the connection between a plurality of wireless communication devices in one group and connects the plurality of wireless communication devices to wireless communication devices in the other group. For example, the master device 20A, the slave devices 22A and 22B that belong to the group 1, as shown in FIG. 2, may disconnect connection between the master device 20A, and the slave devices 22A and 22B and may reconnect to the master device 22C that belongs to the group 2.

However, if the connection between the master device 20A, the slave devices 22A and 22B is disconnected, communication of the slave devices 22A and 22B are lost. Moreover, there may be a problem that if each of the master device 20A, and the slave devices 22A and 22B connects to the master device 20C that belongs to the group 2, it will increase the processing load and time.

Hence, the present embodiments have been invented considering the above issue as a focused point. According to the present embodiments, it becomes possible to connect, while maintaining connections between wireless communication devices which configure a same group, to another group. Hereinafter, the detail of such present embodiments will be explained.

2. A CONFIGURATION OF A WIRELESS COMMUNICATION DEVICE

Figure 3:
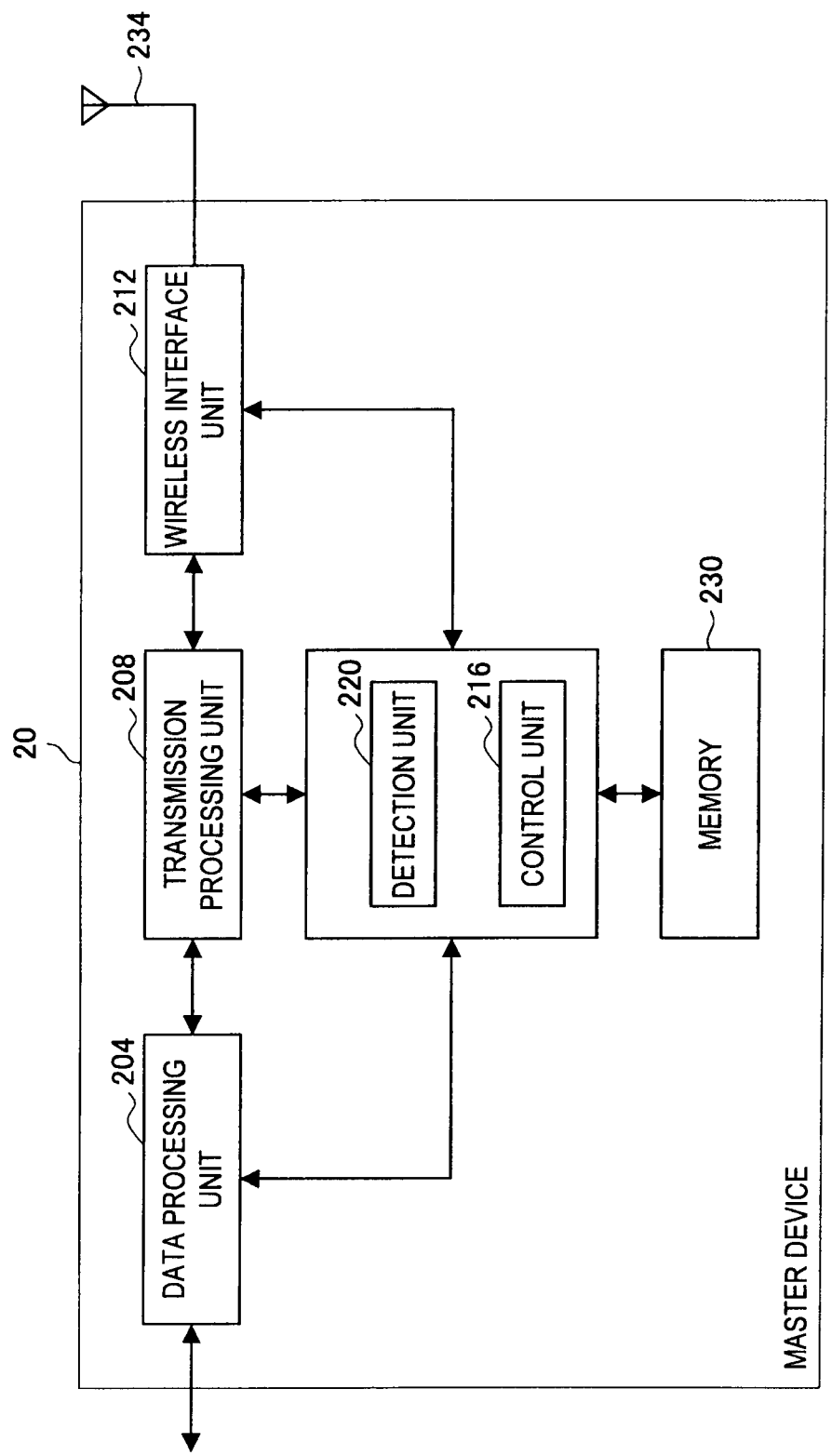
FIG. 3 is a function block diagram showing a configuration of a master device as an example of a wireless communication device according to the present embodiment.

FIG. 3 is a function block diagram showing a configuration of a master device 20 as an example of a wireless communication device according to the present embodiment. Note that the detail explanation on the slave devices 22 will be omitted since the slave device 22 can be configured to be substantially identical to the master device 20.

As shown in FIG. 3, the master device 20 includes a data processing unit 204, a transmission processing unit 208, a wireless interface unit 212, a control unit 216, a detection unit 220, a memory 230 and an antenna 234.

At the time of transmission, the data processing unit 204 creates various data frames and various data packets in response to a request from, for example, a higher-level layer to supply the data frames and the data packets to the transmission processing unit 208. The transmission processing unit 208 at the time of transmission performs processing of addition of error detection codes such as various data headers or FCSs (Frame Check Sequences) to the packets created by the data processing unit 204, and provides the processed data to the wireless interface unit 212. The wireless interface unit 212 creates a modulation signal in a frequency band of a carrier wave from the data received from the transmission processing unit 208 and causes the antenna 234 to transmit the modulation signal as a wireless signal.

Further, in a receiving operation, the wireless interface unit 212 down-converts the wireless signal received by the antenna 234 and converts the wireless signal into a bit string to decode various data frames. The transmission processing unit 208 analyses a header added to the data frame supplied from the wireless interface unit 212. When the transmission processing unit 208 confirms that the data frame has no error based on the error detection code, the transmission processing unit 208 supplies the data frame to the data processing unit 204. The data processing unit 204 processes and analyses the data frame and the data packet supplied from the transmission processing unit 208. Thus, the data processing unit 204, the transmission processing unit 208, the wireless interface unit 212 and the antenna 234 function as a communication unit.

The control unit 216 controls receiving and transmitting operations of each of the data processing unit 204, the transmission processing unit 208 and the wireless interface unit 212. For example, the control unit 216 can perform operations such as determination of a frequency to use, creation of a control message (notification information such as a beacon, a beacon acknowledgement, a probe request and a probe response), issuance of a transmission command for the control message, and interpretation of the control message.

The detection unit 220 detects frequency information indicative of a frequency that is used by other groups existing around. For example, when receiving a probe response with respect to a probe request from other group, the detection unit 220 detects the frequency of the probe response.

The memory 230 plays the role of a work area for the data processing by the control unit 216, and has a function of a storage unit (i.e. a non-transitory storage medium) for holding various types of data. The data may include relationship information defining a communication relationship between the master device 20 and a slave device 22 and/or another master device 20. For example, the relationship information may indicate that the master device 20 is a master device relative to the slave device 22 and/or may indicate encryption information shared between the master device 20 and the slave device 22. For example, the relationship information may include a passphrase, a service set identifier (SSID), a preshared key (PSK), and/or a temporal key (TK). The memory 230 may be a storage medium such as a non-volatile memory, a magnetic disk, an optical disk, a magneto optical (MO) disk, and the like. The non-volatile memory may be an electrically erasable programmable read-only memory (EEPROM), and an erasable programmable ROM (EPROM), for example. Also, the magnetic disk may be a hard disk, a discoid magnetic disk, and the like. Also, the optical disk may be a compact disc (CD), a digital versatile disc recordable (DVD-R), a BD (Blu-ray disc; registered trademark), and the like.

3. CONNECTION OPERATIONS BETWEEN GROUPS

The configuration of the wireless communication devices such as the master device 20 and the slave devices 22 are explained with reference to FIG. 3, as above. Next, examples of a first operation to a fourth operation of the present embodiment for connecting different groups will be explained in order.

3-1. An Example of a First Operation

Figure 4:
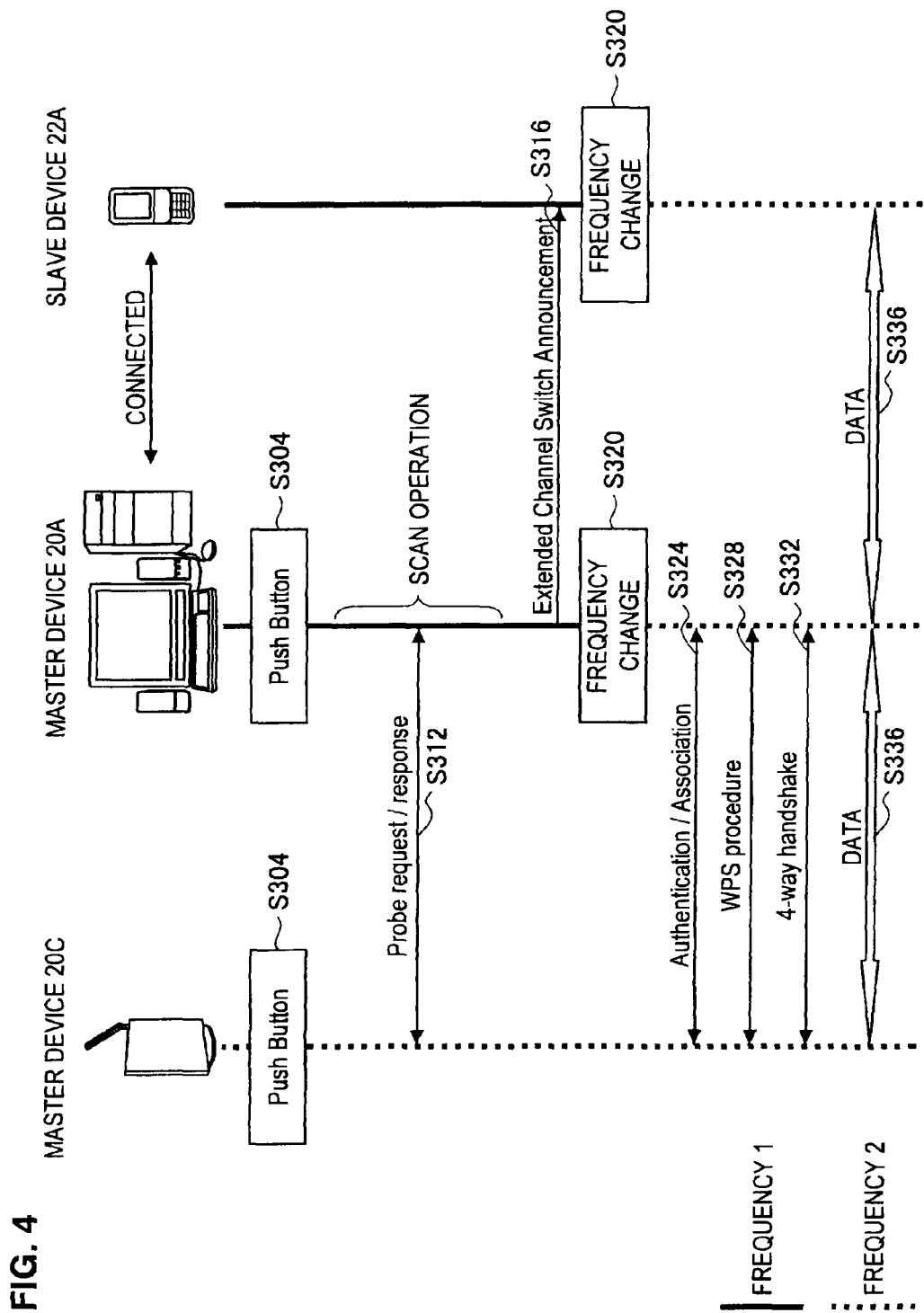
FIG. 4 is a sequence diagram showing an example of a first operation to connect different groups.

FIG. 4 is a sequence diagram showing an example of a first operation to connect different groups. In an example illustrated in FIG. 4, the master device 20A and the slave device 22A are connected, and the master device 20C is currently using the frequency 2 while the master device 20A and the slave device 22A are currently using the frequency 1. Here, in order to connect the master device 20A and the slave device 22A to the master device 20C, when a push button as a connection trigger is pressed by a user in the master device 20A and the master device 20C (S304), the master device 20A starts an active frequency scanning operation to search a connection destination.

Note that the above push button may be mounted physically on the master device 20A and the master device 20C, or may be displayed to be selectable on a screen. Moreover, the above push button may be, for example, a WPS Push Button, or may be other dedicated button. Further, the connection trigger may be a press of a push button or a PIN input. The active frequency scanning operation is an operation which transmits the probe request at all frequencies that the master device 20A can use, and which waits for the probe response for a certain period of time. Further, the connection trigger for connecting the master device 20A and the slave device 22A to the master device 20C is not limited to the button operation by the user, and it may set a configuration, for example, in which the connection trigger would be generated by a decision of devices such as the master device 20A and the slave device 22A when a predetermined condition is met.

This active frequency scanning operation enables the master device 20A to receive the probe response from the master device 20C at the frequency 2 (S312), and to detect the master device 20C that is a wireless communication device to be connected to, and the frequency 2 that the master device 20C is currently using.

Afterward, the control unit 216 of the master device 20A allows the communication unit to broadcast the Extended Channel Switch Announcement message defined in IEEE802.11y for changing the frequency to be used by the group. Hereinafter, the Extended Channel Switch Announcement message will be explained with reference to FIG. 5.

FIG. 5 is an explanatory diagram showing a configuration of an Extended Channel Switch Announcement message. As shown in FIG. 5, this message includes Category, Action-Value, ChannelSwitchMode, NewRegulatoryClass, NewChannelNumber, and ChannelSwitchCount.

NewChannelNumber is information indicating a frequency after changed (i.e., a new frequency), and ChannelSwitchCount is information indicating when communication with the new frequency will begin (i.e., a timing of frequency change (for example, information on how many beacon transmission timings ahead it is)). In the example of operation shown in FIG. 4, information indicating the frequency 2 is described in NewChannelNumber.

Therefore, the slave device 22A that receives this message can refer to NewChannelNumber and ChannelSwitchCount to change the frequency to use into the frequency 2 at the same timing as the master device 20A (S320). Note that FIG. 4 omits the explanation on which other slave device 22B currently connecting to the master device 20A also performs the same operation as the slave device 22A. That is, the slave device 22B receives the Extended Channel Switch Announcement message to acknowledge when and to which frequency to change, then changes the frequency to use into the frequency 2.

Thus, the frequency which the master device 20A, the slave device 22A and the master device 20C use becomes the same. This enables the master device 20A to operate as a master device of the slave device 22A, and as a slave device of the master device 20C as well. Note that the example herein shows a case where the master slave 20A which is not a dedicated access point operates as a slave device of the master device C that is a dedicated access point, however, it may be a case where the master device 20C operates as a slave device of the master device 20A.

Next, the master device 20A performs a connection processing, defined in IEEE802.11 and WiFi Alliance, with respect to the master device 20C. Specifically, the master device 20A and the master device 20C perform Authentication, Association, WPS procedure, 4-way handshake, or the like (S324, S328, S332), and complete a security setting. As the result, a mutual data communication among the master device 20C, the master device 20A and the slave device 22A can be realized (S336).

Figure 6:
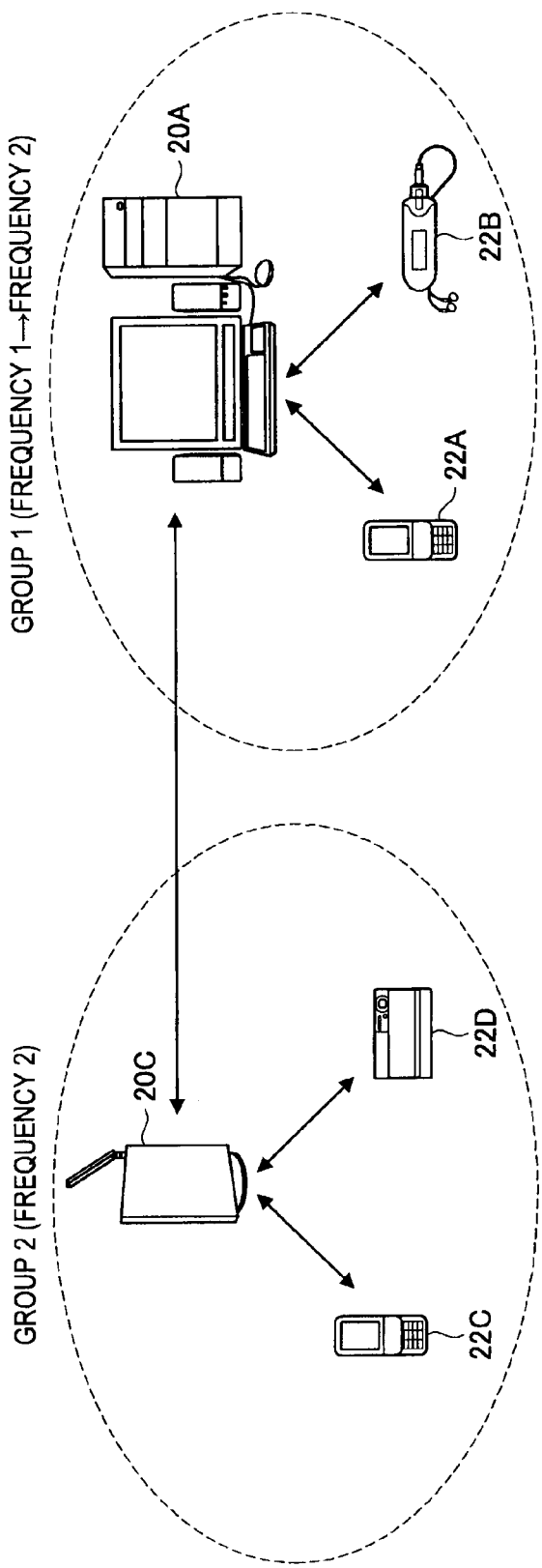
FIG. 6 is an explanatory diagram showing a connection relationship between each of the wireless communication devices after performing a connection operation between groups.

FIG. 6 is an explanatory diagram showing a connection relationship between each of the wireless communication devices after performing the above-mentioned connection operation between groups. As shown in FIG. 6, the master device 20A can connect to the master device 20C in the group 2 while maintaining the connection relationship with the slave devices 22A and 22B which belong to the same group. That is, according to the present embodiment, the slave devices 22A and 22B can communicate with wireless communication devices which belong to the group 2 without performing a connection processing respectively with the master device 20C in the group 2. Note that the connection relationship shown in FIG. 6 will be the same in the examples of the second, third, and fourth operations explained below.

As described above, since the connection relationship between the master device 20A and the slave devices 22A and 22B is maintained at the time of connection operation between groups, there is a merit that the processes for reconnection illustrated by the following examples will be not necessary.

(1) Setting an encryption for security (for example, WPS/WPA)

(2) Building a master-slave relationship to determine which of a master device or a slave device will be a role each device operates (a Group Owner negotiation process by WiFi Direct).

Note that as shown in FIG. 4, maintaining the connection relationship between the master device 20A and the slave devices 22 will be realized by not performing the disconnection process illustrated by the following examples.

(1) One of either the master device 20A or the slave devices 22 expressly transmits deauthentication frame for disconnecting the connection.

(2) The master device 20A is turned off, or is switched to operate at different frequency. In this case, the slave device 22 becomes unable to receive a beacon from the master device 20A, determines that the master device 20A does not exist, and internally treats it as being disconnected or transmits deauthentication frame.

(3) The slave device 22 is turned off, or is switched to operate at different frequency. In this case, the master device 20 becomes unable to observe the transmission/reception with the slave device 22 for over a certain period of time, determines that the slave device 22 does not exist, and internally treat it as being disconnected or transmits deauthentication frame.

3-2. An Example of a Second Operation

Next, an example of the second operation to connect different groups will be explained with reference to FIG. 7.

Figure 7:
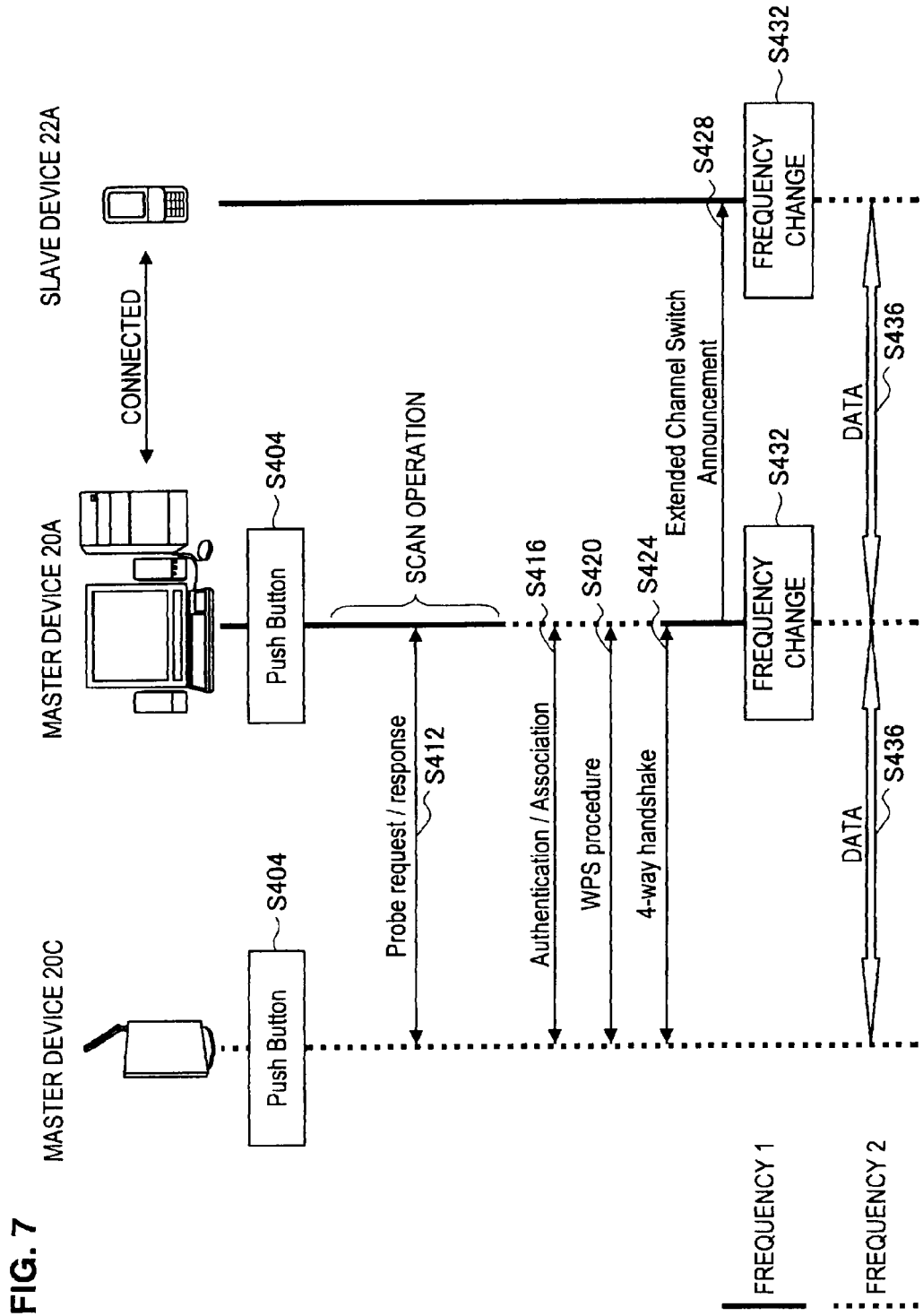
FIG. 7 is a sequence diagram showing an example of a second operation to connect different groups.

FIG. 7 is a sequence diagram showing an example of the second operation to connect different groups. In the example illustrated in FIG. 7, the master device 20A and the slave device 22A are connected, and the master device 20C is currently using the frequency 2 while the master device 20A and the slave device 22A are currently using the frequency 1. Here, in order to connect the master device 20A and the slave device 22A to the master device 20C, when a push button is pressed by a user in the master device 20A and the master device 20C (S404), the master device 20A starts an active frequency scanning operation to search a connection destination.

This active frequency scanning operation enables the master device 20A to receive the probe response from the master device 20C at the frequency 2(S412), and to detect the master device 20C that is a wireless communication device to be connected to, and the frequency 2 that the master device 20C is currently using.

Afterward, the master device 20A changes the frequency to use into the frequency 2 same as the master device 20C, and performs the connection processing, such as authentication, association, WPS procedure, 4-way handshake or the like with respect to the master device 20C (S416, S420, S424). Note that since the master device 20A changes the frequency to use temporarily, the master device 20A and the slave devices 22 may hold the connection information (encryption information, information on a master-slave relationship, or the like) so that the connection relationship will be maintained. After the completion of security setting by the connection processing, the master device 20A changes the frequency to use back to the frequency 1, and transmits the Extended Channel Switch Announcement message (S428).

Therefore, the slave device 22A that receives this message can refer to NewChannelNumber and ChannelSwitchCount to change the frequency to use into the frequency 2 at the same timing as the master device 20A (S432). Thus, the frequency which the master device 20A, the slave device 22A and the master device 20C use becomes the same. As the result, a mutual data communication among the master device 20C, the master device 20A and the slave device 22A can be realized (S436).

3-3. An Example of a Third Operation

Next, an example of the third operation to connect different groups will be explained with reference to FIG. 8 and FIG. 9.

Figure 8:
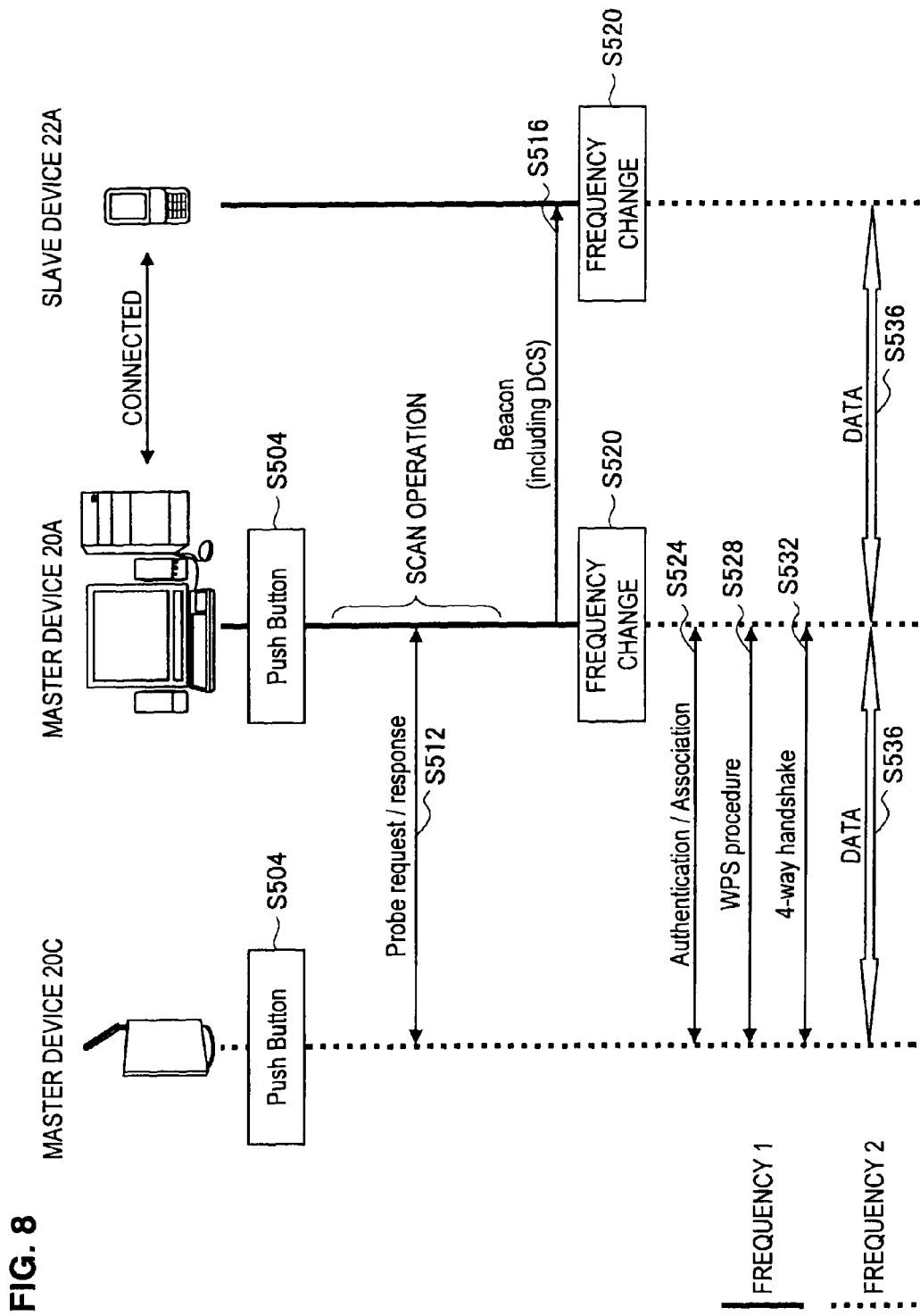
FIG. 8 is a sequence diagram showing an example of a third operation to connect different groups.

FIG. 8 is a sequence diagram showing an example of the third operation to connect different groups. In an example illustrated in FIG. 8, the master device 20A and the slave device 22A are connected, and the master device 20C is currently using the frequency 2 while the master device 20A and the slave device 22A are currently using the frequency 1. Here, in order to connect the master device 20A and the slave device 22A to the master device 20C, when a push button is pressed by a user in the master device 20A and the master device 20C (S504), the master device 20A starts an active frequency scanning operation to search a connection destination.

This active frequency scanning operation enables the master device 20A to receive the probe response from the master device 20C at the frequency 2 (S512), and to detect the master device 20C that is a wireless communication device to be connected to, and the frequency 2 that the master device 20C is currently using.

Afterward, the control unit 216 of the master device 20A allows the communication unit to broadcast the beacon including Channel Switch Announcement IE (Information Element) that is DFS (Dynamic Frequency Selection) information defined in IEEE802.11-2007 for changing the frequency to be used by the group. Hereinafter, the DFS information will be explained with reference to FIG. 9.

FIG. 9 is an explanatory diagram showing a configuration example of the DFS information. As shown in FIG. 9, the DFS information includes ElementID, Length, ChannelSwithMode, NewChannelNumber, and ChannelSwitchCount.

In the DFS information, NewChannelNumber is information indicating a frequency after changed (i.e., a new frequency), and ChannelSwitchCount is information indicating when communication with the new frequency will begin (i.e., a timing of frequency change (for example, how many beacon transmission timings ahead it is)). In the example of operation shown in FIG. 8, information indicating the frequency 2 is described in NewChannelNumber.

Note that the function of this DFS is normally used to change the frequency to use to other frequency when a wireless communication device using a specific frequency, which is assigned to the public use as well, detects that the specific frequency is used in the neighborhood. Therefore, there may be a case where the DFS function is not installed onto a wireless communication device that does not use the above specific frequency, however, a wireless communication device installed with the DFS function can utilize the DFS function for connection between groups as the present embodiment.

The slave device 22A that receives the beacon including the above DFS information can refer to NewChannelNumber and ChannelSwitchCount to change the frequency to use into the frequency 2 at the same timing as the master device 20A (S520). Note that FIG. 8 omits the explanation on which other slave device 22B currently connecting to the master device 20A also performs the same operation as the slave device 22A. That is, the slave device 22B receives the beacon including the DFS information to acknowledge when and to which frequency to change, then changes the frequency to use into the frequency 2 at the same time with the master device 20A and the slave device 22B.

Thus, the frequency which the master device 20A, the slave device 22A and the master device 20C use becomes the same. This enables the master device 20A to operate as a master device of the slave device 22A, and as a slave device of the master device 20C as well.

Next, the master device 20A performs a connection processing, defined in IEEE802.11 and WiFi Alliance, with respect to the master device 20C. Specifically, the master device 20A and the master device 20C perform Authentication, Association, WPS procedure, 4-way handshake, or the like (S524, S528, S532), and complete a security setting. As the result, a mutual data communication among the master device 20C, the master device 20A and the slave device 22A can be realized (S536).

3-4. An Example of a Fourth Operation

Finally, an example of the fourth operation to connect different groups will be explained with reference to FIG. 10.

FIG. 10 is a sequence diagram showing an example of a fourth operation to connect different groups. In an example illustrated in FIG. 10, the master device 20A and the slave device 22A are connected, and the master device 20C is currently using the frequency 2 while the master device 20A and the slave device 22A are currently using the frequency 1. Here, in order to connect the master device 20A and the slave device 22A to the master device 20C, when a push button is pressed by a user in the master device 20A and the master device 20C (S604), the master device 20A starts an active frequency scanning operation to search a connection destination.

This active frequency scanning operation enables the master device 20A to receive the probe response from the master device 20C at the frequency 2 (S612), and to detect the master device 20C that is a wireless communication device to be connected to, and the frequency 2 that the master device 20C is currently using.

Afterward, the master device 20A changes the frequency to use into the frequency 2 same as the master device 20C, and performs the connection processing, such as authentication, association, WPS procedure, 4-way handshake or the like with respect to the master device 20C (S616, S620, S624). Note that since the master device 20A changes the frequency to use temporarily, the master device 20A and the slave devices 22 may hold the connection information (encryption information, information on a master-slave relationship, or the like) so that the connection relationship will be maintained. After the completion of security setting by the connection processing, the master device 20A changes the frequency to use back to the frequency 1, and transmits the Extended Channel Switch Announcement message (S628).

Therefore, the slave device 22A that received this message can refer to NewChannelNumber and ChannelSwitchCount to change the frequency to use into the frequency 2 at the same timing as the master device 20A. Note that FIG. 4 omits the explanation on which other slave device 22B currently connecting to the master device 20A also performs the same operation as the slave device 22A (S632). Thus, the frequency which the master device 20A, the slave device 22A and the master device 20C use becomes the same. As the result, a mutual data communication among the master device 20C, the master device 20A and the slave device 22A can be realized (S636).

4. CONCLUSION

As described above, according to the present embodiment, the master device 20 notifies the slave device 22 that belong to the same group of a frequency used by other groups and a timing of frequency change, changes the frequency to use at the same time with the slave device 22, and performs a connection processing with respect to other groups using the frequency after the change. Therefore, according to the present embodiment, the master device 20 can connect to wireless communication devices that belong to other groups while maintaining a connection relationship with the slave device 22 that belongs to the same group.

It should be understood by those skilled in the art that various modifications, combinations, sub-combinations and alterations may occur depending on design requirements and other factors insofar as they are within the scope of the appended claims or the equivalents thereof.

For example, the above example described a case where selection of a push button becomes a trigger for a connection operation between groups, however, the present invention is not limited to this example. As a modified example, a PIN input of WPS may trigger the start of the connection operation between groups.

Further, each step in the processing of the wireless communication system in this specification is not necessarily performed in the order as described in the sequence diagrams chronologically. For example, each step in the wireless communication system may be processed in the order different from the one described in the flowchart herein, or may be processed in parallel.

Furthermore, it may be created a computer program which enables the hardware such as a CPU, a ROM, a RAM or the like built in the master device 20 and the slave device 22 to perform the equivalent function same as each of the above-described configuration of the master device 20 and the slave device 22. Moreover, a storage medium storing the computer program may be provided.

What is claimed is:

1. A first station for communicating with a second station using a first frequency, the first station comprising:
   a storage unit configured to store relationship information defining a communication relationship between the first station and the second station;
   a communication unit configured to communicate with the second station and with an access point, wherein the access point operates at a second frequency; and
   a detection unit configured to detect, in response to a connection trigger that has been initiated by both the first station and by the access point, frequency information indicative of the second frequency used for wirelessly communicating with the access point,
   wherein the communication unit of the first station is configured to notify, over communication using the first frequency, the second station of the frequency information that indicates the second frequency used for wireless communicating with the access point,
   wherein the communication unit of the first station is further configured to communicate with the second station using the first frequency before notifying the second station of the frequency information that indicates the second frequency used for wireless communicating with the access point, and then, after notifying the second station over the communication using the first frequency of the frequency information that indicates the second frequency and at a same timing the second station makes a frequency change to the second frequency, to change a frequency used for the communication with the second station into the second frequency and then communicate with the second station using the second frequency,
   wherein the first station and the second station are members of a first communication group that utilizes the first frequency for communication before making the change to the frequency used for the communication, and the access point is a member of a second communication group that utilizes the second frequency for communication which is different than the first frequency,
   wherein the communication relationship is maintained when the communication unit begins communicating with the access point operating at the second frequency,
   wherein the relationship information indicates that the first station is a master station,
   wherein the relationship information includes at least one of a passphrase, a service set identifier (SSID), a preshared key (PSK), or a temporal key (TK), and
   wherein the storage unit, the communication unit, and the detection unit are each implemented via at least one processor.

2. The first station of claim 1, wherein the communication unit notifies the second station of the frequency information, so as to allow the second station to make the frequency change to the second frequency without performing a connection processing directly between the second station and the access point.

3. A first station for communicating with a second station using a first frequency, the first station comprising:
   a storage unit configured to store relationship information defining a communication relationship between the first station and the second station;
   a communication unit configured to communicate with the second station and with an access point, wherein the access point operates at a second frequency; and
   a detection unit configured to detect, in response to a connection trigger that has been initiated by both the first station and by the access point, frequency information indicative of the second frequency used for wirelessly communicating with the access point,
   wherein the communication unit of the first station is configured to notify, over communication using the first frequency, the second station of the frequency information that indicates the second frequency used for wireless communicating with the access point,
   wherein the communication unit of the first station is further configured to communicate with the second station using the first frequency before notifying the second station of the frequency information that indicates the second frequency used for wireless communicating with the access point, and then, after notifying the second station over the communication using the first frequency of the frequency information that indicates the second frequency and at a same timing the second station makes a frequency change to the second frequency, to change a frequency used for the communication with the second station into the second frequency and then communicate with the second station using the second frequency,
   wherein the first station and the second station are members of a first communication group that utilizes the first frequency for communication before making the change to the frequency used for the communication, and the access point is a member of a second communication group that utilizes the second frequency for communication which is different than the first frequency,
   wherein the communication relationship is maintained when the communication unit begins communicating with the access point operating at the second frequency,
   wherein the relationship information indicates encryption information shared between the first station and the second station, and also indicates that the first station is a master station,
   wherein the relationship information includes at least one of a passphrase, a service set identifier (SSID), a preshared key (PSK), or a temporal key (TK), and
   wherein the storage unit, the communication unit, and the detection unit are each implemented via at least one processor.

4. A first station for communicating with a second station using a first frequency, the first station comprising:
   a storage unit configured to store relationship information defining a communication relationship between the first station and the second station;
   a communication unit configured to communicate with the second station and with an access point, wherein the access point operates at a second frequency; and a detection unit configured to detect, in response to a connection trigger that has been initiated by both the first station and by the access point, frequency information indicative of the second frequency used for wirelessly communicating with the access point, wherein the communication unit of the first station is configured to notify, over communication using the first frequency, the second station of the frequency information that indicates the second frequency used for wireless communicating with the access point, wherein the communication relationship is maintained when the communication unit begins communicating with the access point operating at the second frequency, wherein the communication unit is configured to communicate with the second station using the first frequency before notifying the second station of the frequency information that indicates the second frequency used for wireless communicating with the access point, wherein, after notifying the second station over the communication using the first frequency of the frequency information that indicates the second frequency, the communication unit is configured to change, at a same timing the second station makes a frequency change to the second frequency, a frequency used for the communication with the second station into the second frequency, and then communicate with the second station using the second frequency, wherein the first station and the second station are members of a first communication group that utilizes the first frequency for communication before making the change to the frequency used for the communication, and the access point is a member of a second communication group that utilizes the second frequency for communication which is different than the first frequency, wherein the relationship information indicates that the first station is a master station, wherein the relationship information includes at least one of a passphrase, a service set identifier (SSID), a preshared key (PSK), or a temporal key (TK), and wherein the storage unit, the communication unit, and the detection unit are each implemented via at least one processor.

5. The first station of claim 4, wherein the communication unit is configured to notify the second station of when the communication unit will begin communicating with the second station using the second frequency.

6. The first station of claim 5, wherein the communication unit is configured to notify the second station of the frequency information and of when the communication unit will begin communicating with the second station using the second frequency by:

transmitting an Extended Channel Switch Announcement.

7. The first station of claim 5, wherein the communication unit is configured to notify the second station of the frequency information and of when the communication unit will begin communicating with the second station using the second frequency by:

transmitting Dynamic Frequency Selection information.

8. A first station for communicating with a second station using a first frequency, the first station comprising:

a storage unit configured to store relationship information defining a communication relationship between the first station and the second station;

a communication unit configured to communicate with the second station and with an access point, wherein the access point operates at a second frequency; and a detection unit configured to detect, in response to a connection trigger that has been initiated by both the first station and by the access point, frequency information indicative of the second frequency used for wirelessly communicating with the access point, wherein the communication unit of the first station is configured to notify, over communication using the first frequency, the second station of the frequency information that indicates the second frequency used for wireless communicating with the access point, wherein the communication relationship is maintained when the communication unit begins communicating with the access point operating at the second frequency, wherein the communication unit is configured to communicate with the second station using the first frequency before notifying the second station of the frequency information that indicates the second frequency used for wireless communicating with the access point, wherein, after notifying the second station over the communication using the first frequency of the frequency information that indicates the second frequency, the communication unit is configured to change, at a same timing the second station makes a frequency change to the second frequency, a frequency used for the communication with the second station into the second frequency, and then communicate with the access point using the second frequency, wherein the first station and the second station are members of a first communication group that utilizes the first frequency for communication before making the change to the frequency used for the communication, and the access point is a member of a second communication group that utilizes the second frequency for communication which is different than the first frequency, wherein the relationship information indicates that the first station is a master station, wherein the relationship information includes at least one of a passphrase, a service set identifier (SSID), a preshared key (PSK), or a temporal key (TK), and wherein the storage unit, the communication unit, and the detection unit are each implemented via at least one processor.

9. A first station for communicating with a second station using a first frequency, the first station comprising:

a storage unit configured to store relationship information defining a communication relationship between the first station and the second station; and a communication unit configured to communicate with the second station and with an access point, wherein the access point operates at a second frequency, and the first station is configured to detect frequency information indicative of the second frequency in response to a connection trigger that has been initiated by both the first station and by the access point, wherein the communication unit of the first station is configured to communicate with the second station using the first frequency before notifying the second station over communication using the first frequency of the frequency information that indicates the second frequency the access point uses for communication, and then, after notifying the second station over the communication using the first frequency of the frequency information that indicates the second frequency and at a same timing the second station makes a frequency change to the second frequency, to change a frequency used for the communication with the second station into the second frequency and then communicate with the second station using the second frequency as indicated by the frequency information, wherein the first station and the second station are members of a first communication group that utilizes the first frequency for communication before making the change to the frequency used for the communication, and the access point is a member of a second communication group that utilizes the second frequency for communication which is different than the first frequency, wherein the communication relationship is maintained when the communication unit begins communicating with the access point operating at the second frequency, wherein the first station is a master station relative to the second station and is a slave station relative to the access point, wherein the relationship information includes at least one of a passphrase, a service set identifier (SSID), a preshared key (PSK), or a temporal key (TK), and wherein the storage unit and the communication unit are each implemented via at least one processor.

10. A method of operating a first station, comprising:
storing relationship information defining a communication relationship between the first station and a second station;
communicating with the second station using a first frequency;
communicating with an access point operating at a second frequency;
detecting, in response to a connection trigger that has been initiated by both the first station and by the access point, frequency information indicative of the second frequency used for wirelessly communicating with the access point; and
notifying, from the first station over communication using the first frequency, the second station of the frequency information that indicates the second frequency used for wireless communicating with the access point;
wherein communication is made with the second station using the first frequency before notifying the second station of the frequency information that indicates the second frequency used for wireless communicating with the access point, and then, after notifying the second station over the communication using the first frequency of the frequency information that indicates the second frequency and at a same timing the second station makes a frequency change to the second frequency, a frequency used for the communication with the second station is changed into the second frequency and then communication is made with the second station using the second frequency as indicated by the detected frequency information,
wherein the first station and the second station are members of a first communication group that utilizes the first frequency for communication before making the change to the frequency used for the communication, and the access point is a member of a second communication group that utilizes the second frequency for communication which is different than the first frequency,
wherein the communication relationship is maintained when the first station begins communicating with the access point operating at the second frequency,
wherein the relationship information indicates that the first station is a master station, and
wherein the relationship information includes at least one of a passphrase, a service set identifier (SSID), a preshared key (PSK), or a temporal key (TK).

11. A non-transitory, computer-readable storage medium storing a program that, when executed by a processor, causes a first station to perform a method, the method comprising:
storing relationship information defining a communication relationship between the first station and a second station;
communicating with the second station using a first frequency;
communicating with an access point operating at a second frequency;
detecting, in response to a connection trigger that has been initiated by both the first station and by the access point, frequency information indicative of the second frequency used for wirelessly communicating with the access point; and
notifying, from the first station over communication using the first frequency, the second station of the frequency information that indicates the second frequency used for wireless communicating with the access point;
wherein communication is made with the second station using the first frequency before notifying the second station of the frequency information that indicates the second frequency used for wireless communicating with the access point, and then, after notifying the second station over the communication using the first frequency of the frequency information that indicates the second frequency and at a same timing the second station makes a frequency change to the second frequency, a frequency used for the communication with the second station is changed into the second frequency and then communication is made with the second station using the second frequency as indicated by the detected frequency information,
wherein the first station and the second station are members of a first communication group that utilizes the first frequency for communication before making the change to the frequency used for the communication, and the access point is a member of a second communication group that utilizes the second frequency for communication which is different than the first frequency,
wherein the communication relationship is maintained when the first station begins communicating with the access point operating at the second frequency,
wherein the relationship information indicates that the first station is a master station, and
wherein the relationship information includes at least one of a passphrase, a service set identifier (SSID), a preshared key (PSK), or a temporal key (TK).

12. A first station for communicating with a second station using a first frequency, the first station comprising:
a storage unit having a computer-readable storage medium configured to store key information including at least one of a preshared key or a temporal key (PK); and
a communication unit configured to start a communication with an access point using a second frequency when the first station is communicating with the second station using the first frequency,
wherein, prior to the start of communication with the access point using the second frequency, the first station is configured to detect frequency information indicative of the second frequency in response to a connection trigger that has been initiated by both the first station and by the access point, wherein the communication unit of the first station is configured to communicate with the second station using the first frequency before notifying the second station over communication using the first frequency of the frequency information that indicates the second frequency the access point uses for communication, and then, after notifying the second station over the communication using the first frequency of the frequency information that indicates the second frequency and at a same timing the second station makes a frequency change to the second frequency, to change a frequency used for the communication with the second station into the second frequency and then communicate with the second station using the second frequency as indicated by the frequency information, wherein the first station and the second station are members of a first communication group that utilizes the first frequency for communication before making the change to the frequency used for the communication, and the access point is a member of a second communication group that utilizes the second frequency for communication which is different than the first frequency, wherein the key information is maintained when the first station starts to communicate with the access point, wherein the first station is a master station relative to the second station, and where the communication unit is implemented via at least one processor.

* * * * *